(12) United States Patent
Narasimhan et al.

(10) Patent No.: US 11,663,594 B2
(45) Date of Patent: May 30, 2023

(54) SYSTEMS AND METHODS FOR LOCATION BASED ACCOUNT INTEGRATION AND ELECTRONIC AUTHENTICATION

(71) Applicant: PayPal, Inc., San Jose, CA (US)

(72) Inventors: Srivathsan Narasimhan, San Jose, CA (US); Cheng Tian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/563,277

(22) Filed: Dec. 28, 2021

(65) Prior Publication Data

US 2022/0122068 A1  Apr. 21, 2022

Related U.S. Application Data

(63) Continuation of application No. 16/730,436, filed on Dec. 30, 2019, now Pat. No. 11,295,306, which is a
(Continued)

(51) Int. Cl.
*G06Q 40/00* (2023.01)
*G06Q 20/40* (2012.01)
(Continued)

(52) U.S. Cl.
CPC ............ *G06Q 20/40* (2013.01); *G06Q 20/10* (2013.01); *G06Q 20/32* (2013.01); *G06Q 20/326* (2020.05); *G06Q 20/3224* (2013.01)

(58) Field of Classification Search
USPC ............... 705/44, 39, 37, 38, 26; 706/25, 45
See application file for complete search history.

(56) References Cited

U.S. PATENT DOCUMENTS 7,516,882 B2 * 4/2009 Cucinotta ............ G06Q 20/045
235/379
8,881,250 B2  11/2014 Yefimov et al.
(Continued)

OTHER PUBLICATIONS

Secure remote mobile payment architecture and application; 2010 International Symposium on Computer, Communication, Control and Automation (3CA) (vol. 1, pp. 487-490); Xi Li, Wei Zhu, Mingxing He; May 5, 2010. (Year: 2010).*
(Continued)

*Primary Examiner* — Tien C Nguyen
(74) *Attorney, Agent, or Firm* — Haynes and Boone, LLP

(57) ABSTRACT

Systems and methods for an account integration system include establishing, by a service provider device, a first session with a service provider account associated with a user. After determining that a second session between a user device and the third party account of the user is active, a first validation is caused to access third party account information associated with the second session. The third party account information and the service provider account information are concurrently displayed by a display interface of the service provider device. A transaction request for a transaction associated with the service provider account and the third party account of the user is received. Information is sent to cause a second validation of the transaction request by a provider of the third party account. In response to the second validation of the transaction request, the requested transaction is processed.

20 Claims, 17 Drawing Sheets

Related U.S. Application Data continuation of application No. 15/714,062, filed on Sep. 25, 2017, now Pat. No. 10,521,792.

(51) Int. Cl.
*G06Q 20/10* (2012.01)
*G06Q 20/32* (2012.01)

(56) References Cited

U.S. PATENT DOCUMENTS

| | | | |
|---|---|---|---|
| 9,113,333 B2 | 8/2015 | Lo et al. | |
| 9,852,624 B2* | 12/2017 | Ginsberg | G08G 1/07 |
| 10,024,978 B2* | 7/2018 | Ben-Akiva | G08G 1/0112 |
| 10,074,225 B2* | 9/2018 | Somani | G07B 15/00 |
| 2005/0071671 A1* | 3/2005 | Karaoguz | G06Q 20/322 |
| | | | 705/77 |
| 2009/0076966 A1* | 3/2009 | Bishop | G06Q 20/363 |
| | | | 705/67 |
| 2009/0267867 A1 | 10/2009 | Gonia | |
| 2009/0271853 A1* | 10/2009 | Everhart | G06Q 20/388 |
| | | | 726/6 |
| 2011/0153495 A1* | 6/2011 | Dixon | G06Q 20/10 |
| | | | 235/384 |
| 2012/0265679 A1 | 10/2012 | Calman et al. | |
| 2013/0275032 A1* | 10/2013 | Yorke | G08G 1/052 |
| | | | 701/119 |
| 2014/0279519 A1* | 9/2014 | Mattes | G06Q 20/12 |
| | | | 705/44 |
| 2016/0087959 A1* | 3/2016 | Park | H04W 12/04 |
| | | | 713/168 |

OTHER PUBLICATIONS

Research on WAP clients supports SET payment protocol; IEEE Wireless Communications (vol. 9, Issue: 1, pp. 90-95); Liang Jin, Shi Ren, Liang Feng, Gao Zheng Hua; Feb. 1, 2002. (Year: 2002).*
Abbas H., et al., "Identifying an OpenID Anti-Phishing Scheme for Cyberspace," Security and Communication Networks, 2016, vol. 09, doi: 10.1002/sec.1027, published online on May 7, 2014, 12 pages.
Carmel G., "Systems and Methods for Determining to Use Geo-Fencing by Using Straight-Line Distances between Locations", Mar. 15, 2013, 14 pages.
Martinez A.R., et al., "Towards a Generic Payment Framework for Internet Media-on-Demand Services Based on RTSP," Mar. 25, 2008, 22nd International Conference on Advanced Information Networking and Applications (aina 2008), pp. 826-833.
Racz P., et al., "A Service Model and Architecture in Support of IP Service Accounting," Apr. 3, 2006, 2006 IEEE/IFIP Network Operations and Management Symposium NOMS 2006, 14 pages.
Shang W., et al., "A Practical Web-Based NSS Framework for E-Business Negotiation," Proceedings of the 38th Annual Hawaii International Conference on System Sciences, Jan. 1, 2005, 12 pages.

* cited by examiner

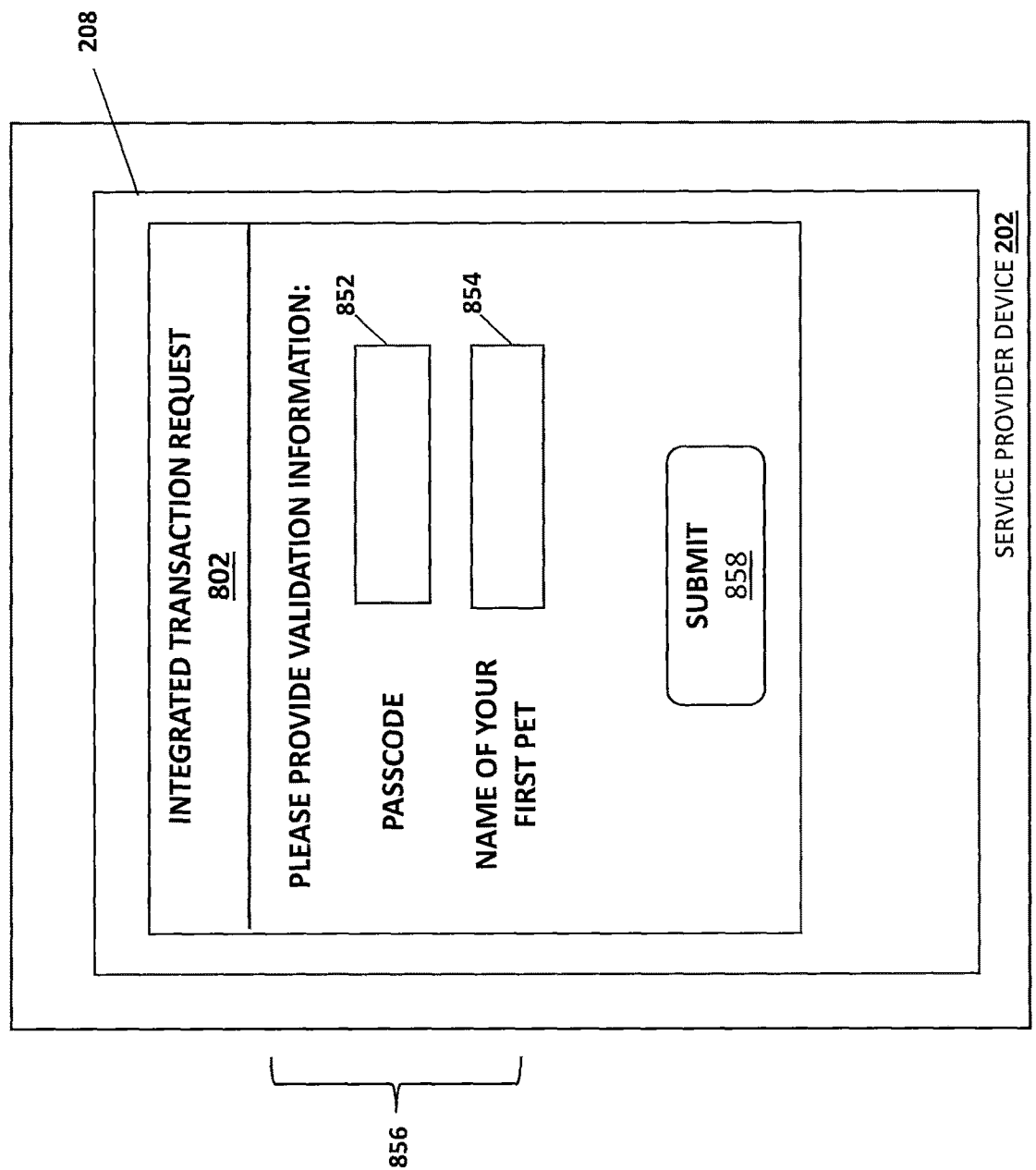

SYSTEMS AND METHODS FOR LOCATION BASED ACCOUNT INTEGRATION AND ELECTRONIC AUTHENTICATION

CROSS REFERENCE TO RELATED APPLICATIONS

The present application is a continuation application of U.S. patent application Ser. No. 16/730,436, filed Dec. 30, 2019, which is a continuation of U.S. patent application Ser. No. 15/714,062, filed Sep. 25, 2017, now U.S. Pat. No. 10,521,792, and is incorporated in reference in its entirety.

BACKGROUND

Field of Disclosure

The present disclosure generally relates to electronic authentication and account management, and more particularly to electronic authentication and account integration that performs integration of different service provider accounts for a user using location based electronic authentication.

Related Art

More and more consumers are conducting electronic transactions, such as purchasing items and services, via computing devices over electronic networks such as, for example, the Internet. Consumers routinely purchase products and services from merchants and individuals alike. The transactions may take place directly between a physical or online merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why online and mobile purchases are growing very quickly.

Utilizing advances in mobile transaction technology, users may perform various transactions/activities in addition to online and mobile purchases using their smartphones, tablets, laptop computers, and/or other personal mobile computing devices. For example, users may use personal health management applications on their mobile devices to keep track of fitness or nutrition data and help them make healthier choices in their everyday life. For further example, users may use personal financial management applications on their mobile devices to track bank, credit card, investment, and loan balances and transactions, as well as create budgets and set financial goals.

Many service providers have service provider devices (e.g., automated teller machine (ATM) devices, drive-through ordering devices, point of sale (POS) devices, vending kiosks) providing various services at service provider physical locations (e.g., an ATM location, a drive-through restaurant, a physical merchant location). Conventional service provider devices at those service provider physical locations and mobile device systems have drawbacks and inconvenient features that have impeded their interaction and limited their use. For example, an ATM device typically does not interact with personal financial management applications on a mobile user device. For further example, drive-through ordering devices typically do not utilize nutrition advice offered by health applications on a mobile user device. For further example, POS devices typically do not monitor transactions based on budgets and financial goals provided by the personal financial management applications on a mobile user device.

Further, as mobile user devices and their displays are getting smaller, such as for example smart watches, public electronic displays are getting larger and becoming available in more public locations like airports, subways, and bus stations. As such, there is a need for better display capability of the user device utilizing the public electronic displays, which has been necessitated by the advent of and advances with mobile computing devices and in particular wearable mobile computing devices, as well as increased functionality of such public electronic displays.

In addition, using electronic service provider in public places (e.g., a portable device on loan from an electronic service provider, a display device on a vehicle (e.g., a taxi, a plane, a train, etc.) for passengers provided by a vehicle service provider), such as discussed above, involves inherent risk of user sensitive data, like passwords or PINs, being stolen or otherwise obtained by unauthorized users. Further, such devices are limited in their ability to authenticate a user, as any user can typically access an account by simply entering in a valid password or PIN, along with account information, such as debit or credit card. With more and more sophisticated techniques, such data is now more easily obtained than ever, and physical card theft has always been an issue.

Thus, there is a need for improvements to electronic authentication and account integration that address the issues detailed above.

BRIEF DESCRIPTION OF THE FIGURES

FIG. 8B is a schematic view illustrating an embodiment of a service provider device displaying a transaction validation request;

Figure 1:
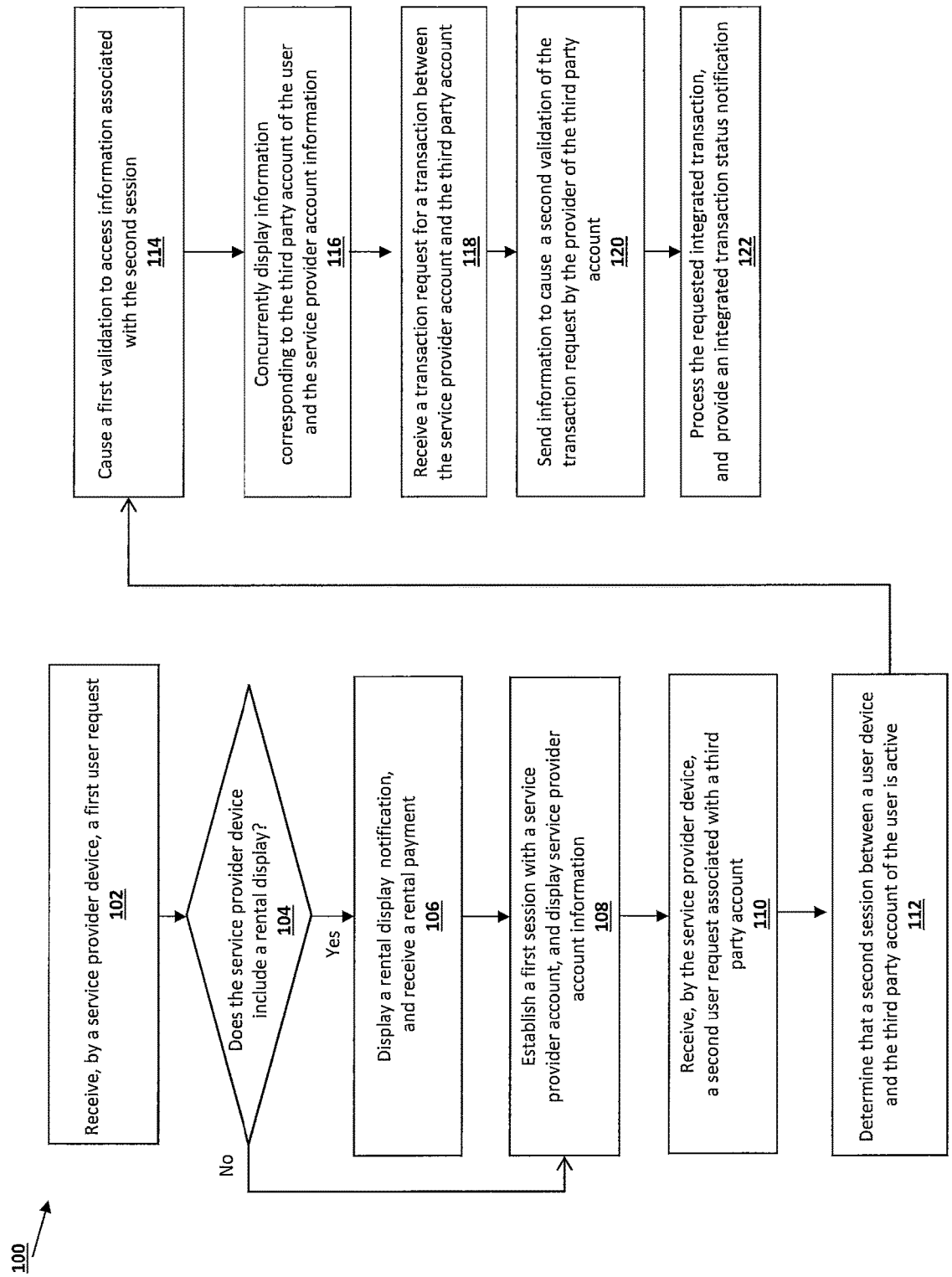
FIG. 1 is a flow chart illustrating an embodiment of a method for location based account integration.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing electronic authentication and account integration that allow mobile user devices to facilitate account integration at a service provider device for accounts associated with different service providers. A user may send a first user request to a service provider device that causes establishment of a session with a service provider account. The user may then send a second user request to the service provider device for accessing third account information using the user device. Such a second user request may be validated using an active session between the user device and the third party account of the user. The active session may also be used to access the third account information. In some embodiments, the service provider device may perform account integration based on the session with the service provider account and the active session between the user device and the third party account of the user. An integrated display may then be provided by displaying concurrently, using a display interface of the service provider device, the third party account information and the service provider account information. In some embodiments, the service provider device may perform account integration based on the session with the service provider account and the active session between the user device and the third party account of the user, and cause an integrated transaction associated with the third party account and the service provider account to be performed. In various embodiments, location based authentication may be used to validate the user requests and transaction requests for improved security.

Figure 2:
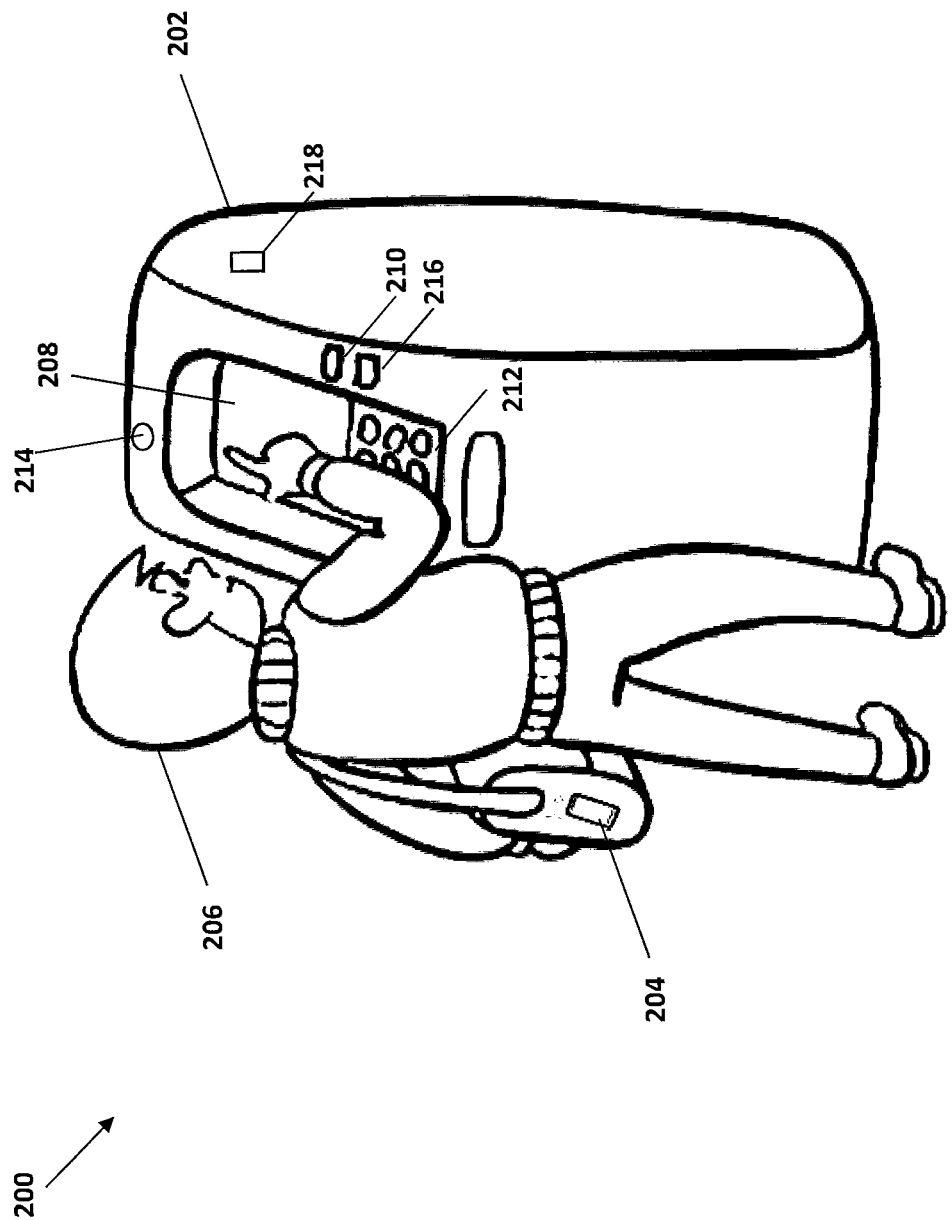
FIG. 2 is a schematic view illustrating an embodiment of a service provider physical location including a service provider device and a user device.

Referring to FIG. 1, an embodiment of a method 100 for providing account integration is illustrated. The method 100 may begin at block 102 where a service provider device receives a first user request from a user. Referring to FIG. 2, an embodiment of a layout of a service provider physical location 200 is illustrated. In the example of FIG. 2, the service provider physical location 200 is provided in an automated teller machine (ATM) location providing service to a particular bank or multiple banks. In alternative embodiments, the service provider physical location 200 may be provided in a floor of a merchant store, a restaurant, a vehicle, and any other suitable locations.

In the example of FIG. 2, the service provider physical location 200 includes a service provider device 202 where an ATM device 202 is illustrated as the service provider device 202. In other embodiments, the service provider device 202 may include devices associated with other service providers, including, for example, a POS device at a merchant store providing checkout service, and a food self-order device providing food ordering service. The service provider device 202 may include one or more card readers 210 such as magnetic stripe or chip readers for reading conventional payment cards (e.g., bank cards, credit cards, and private label credit cards (PLCC or store cards)), and an input system 212 (e.g., a personal identification number (PIN) input systems which may be used to enter a PIN). The service provider device 202 may each also include one or more display subsystems 208 such as, for example, touchscreen display subsystems (e.g., capacitive sensor touch screen displays).

In some examples, the service provider device 202 may include a bar code reader 216 (e.g., a one-dimensional (1D) barcode reader, a two-dimensional (2D) (e.g., Quick Response (QR) code) barcode reader), which may be configured to scan or capture an image of a code provided on a display of a user device or printed on a product, and/or perform a lookup of relevant information (e.g., payment account information, authentication information) based on the scanned code. In some embodiments, transactions may be performed at the service provider device 202 by engaging a card with the card reader (e.g., "swiping," inserting, or "tapping" the card). In some embodiments, transactions between the service provider account (e.g., a bank account) associated with the service provider device 202 and a third party account (e.g., a payment service provider account such as provided by PayPal, Inc. of San Jose, Calif.) of a user 206 may be performed at the service provider device 202 using a user device 204 associated with the user 206, as described in detail below.

In some embodiments, the service provider device 202 may include an adjustable private screen (e.g., in addition to the display subsystems 208) that may be moved to face a user 206 that is located adjacent the service provider device 202. For example, the adjustable private screen may be configured such that other users (e.g., in a queue behind the user 206) may not view the user 206's interactions with the private screen (e.g., providing a passcode, selecting a third party account to integrate and perform a transaction, and/or any of the other interactions discussed below).

In the example illustrated in FIG. 2, the service provider device 202 includes a camera 214 positioned to capture an image or video of the user 206 with the surroundings, which as discussed below may be utilized to extract information associated with the user 206 (e.g., location of the user 206, identity of the user 206) for authentication. As such, the camera 214 may be provided with sufficient resolution such that images and/or video captured by the camera 214 allow an image processing subsystem (e.g., an image recognition subsystem to resolve facial features sufficiently to identify a particular customer) to extract the relevant information of the user.

In the illustrated example, the service provider device 202 includes one or more communication devices or other wireless communication devices 218 that are configured to communicate with the user device 204, a server for the service provider device 202, a third party service provider device (e.g., a payment service provider device), and/or any other devices and/or subsystems discussed below. The authentication may be configured based on the communication ranges of the communication devices 218 as described in detail below. In an example, a distance between the service provider device 202 and the user device 204 may be less than the communication ranges of the communication devices 218 of the service provider device 202 and communication devices of the user device 204. In some embodiments, the service provider device 202 may use wireless communication device 218 to communicate various information with the user device 204 through a network (e.g., one or more wireless networks).

In some embodiments, the wireless communication device 218 may include a beacon subsystem and/or other wireless communication subsystems that are configured to detect Bluetooth low energy (BLE) signals (e.g., broadcasted by a BLE beacon "dongle" in the user device 204) when the user device 204 moves within a detection range of the wireless communication device 218. As such, the service provider device 202 and the user device 204 may perform low power BLE communications using a BLE device in the user device 204 and the BLE beacon subsystem in the service provider device 202. As discussed below, such BLE communications may occur automatically and without the need for any affirmative action by the user on the service provider device 202 and/or user device 204 using, for example, a process on the service provider device 202 that runs continuously, semi-continuously, or intermittently in an automated fashion in a "background" of the operating system on the service provider device 202.

In some embodiments, the wireless communication device 218 may include a radio frequency identification (RFID) tag and/or reader, a near-field communication (NFC) tag and/or reader, and/or other relatively short range wireless communications subsystems known in the art. As such, the service provider device 202 and the user device 204 may perform short-range (e.g., RFID or NFC) communications using an RFID/NFC subsystem (e.g., a tag and/or reader) in the user device 204 and an RFID/NFC subsystem (e.g., a tag and/or reader) in the service provider device 202.

At block 102, the service provider device 202 may receive a user request from the user 206. In some embodiments, the user request is performed by the user through a touch screen display 208 of the service provider device 202. For example, a user 206 may swipe/insert a bank card in the card reader 210 of the service provider device 202, provide passcode (e.g., using an input system 212) associated with a service provider account (e.g., a bank account associated with the bank card), and send a user request to the service provider device 202.

The method 100 may then proceed to block 102, where the service provider device 202 determines whether its display subsystem 208 includes a rental display. A rental display may be a public display that may be rented by users for a particular period time, and display contents received from a user device associated with the user. A user device 204, such as a smart watch or other wearable computing device, may have a display of a limited size such that it may be easily carried around by a user. However, in some embodiments, a user may prefer to use a larger display for one or more applications of the user device 204. In those embodiments, the user may rent a public display of the service provider device 202 for a particular period, such that the user may use the public display to display contents associated with the user device 204.

In some embodiments, at block 104, the service provider device 202 determines that it provides a display for rental.

The method 100 then proceeds to block 106, where the service provider device 202 sends to the user a rental display notification through its display subsystem 208.

Figure 3:
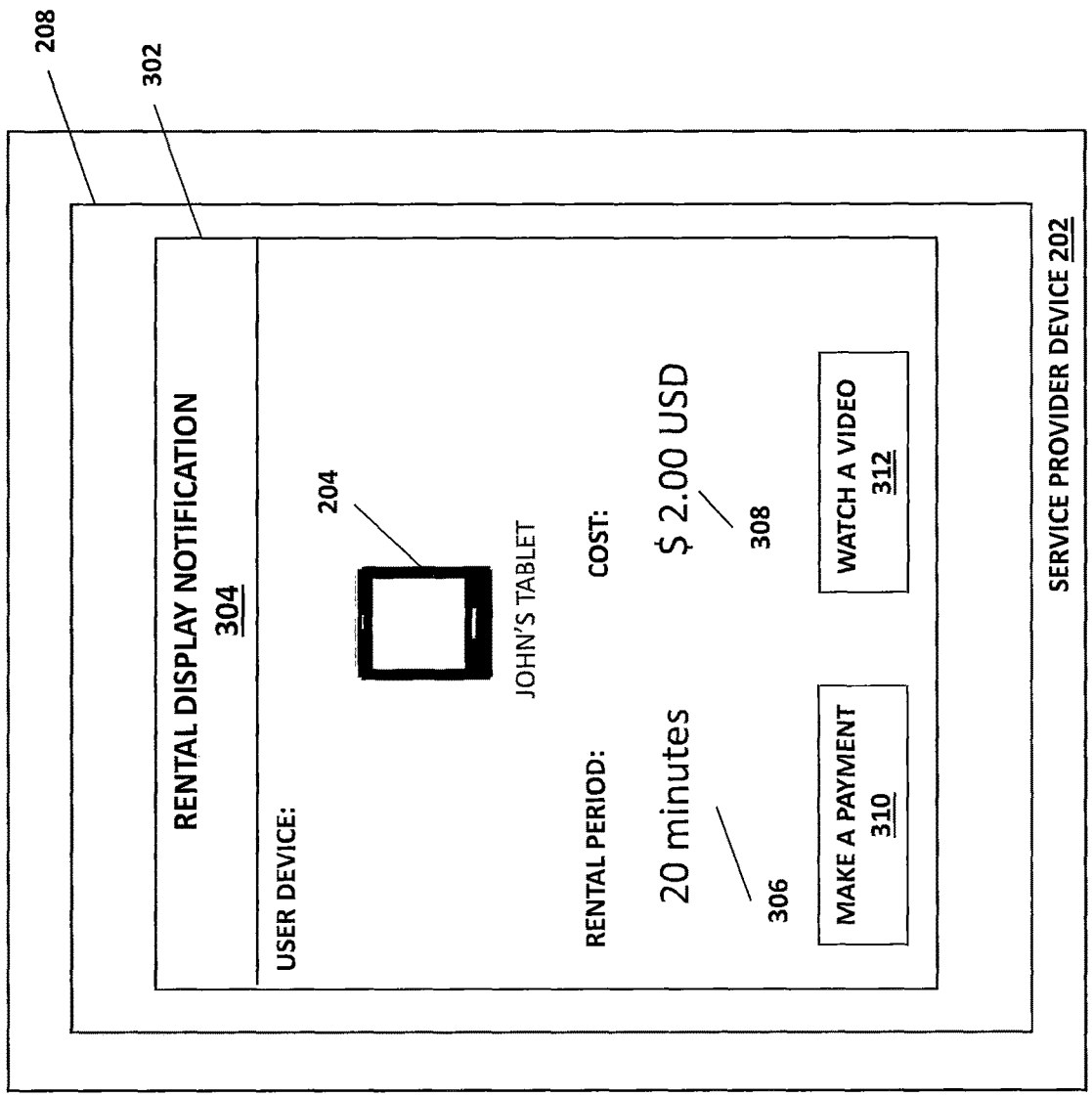
FIG. 3 is a schematic view illustrating an embodiment of a service provider device displaying a rental display notification.

Referring to FIG. 3, illustrated is a service provider device 202 including a display subsystem 208 displaying a rental display notification screen 302 including a rental display notification 304. The rental display notification 304 may include a user device 204 detected by the service provider device 202, a rental period 306 (e.g., "20 minutes"), and a rental cost 308 (e.g., "$2.00 USD"). In an example, a user 206 may make a payment by choosing a selection 310 (e.g., "MAKE A PAYMENT"). In another example, instead of making a payment, the user 206 may use the rental display by performing activities including, for example, watching a video by choosing a selection 312 (e.g., "WATCH A VIDEO"), install an application on the user device 204, provide an email address, answer a survey, and/or any other activities. At block 106, the service provider device 202 may also determine that the user has made the payment or performed the required activities for using the rental display. In some embodiments, the user may then use the display subsystem 208 of the service provider device 202 to display content associated with the user device 204 (e.g., content received from the user device 204, video from a link provided by the user device 204, etc.). Alternatively, in some embodiments, the method 100 may proceed to block 108, where the service provider device 202 may establish a first session with a service provider account associated with the user 206, and display service provider account information.

In some embodiments, at block 104, the service provider device 202 determines that it does not include a rental display. In those embodiments, the method 100 may proceed to block 108 to establish a session with a service provider account associated with the user 206.

In various embodiments, at block 108, the service provider device 202 may establish a session associated with a service provider account (e.g., a bank account) associated with the user 206. The session may be established between the service provider device 202 and a service provider server using bank card information (e.g., received from a card reader 210) and passcode information (e.g., received from the input system 212).

Figure 4:
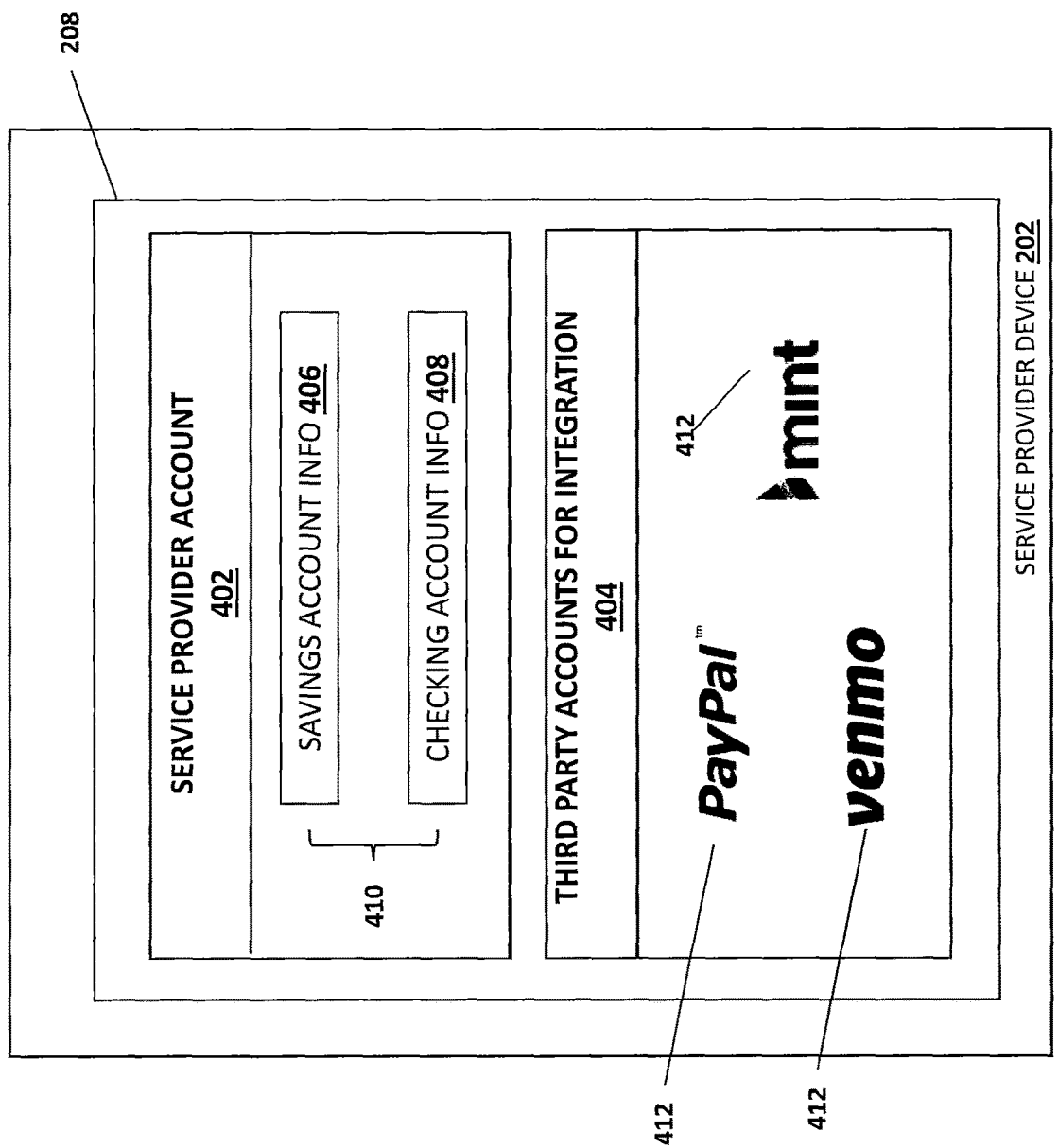
FIG. 4 is a schematic view illustrating an embodiment of a service provider device displaying service provider account information.

In some embodiments, at block 108, after the service provider device 202 establishes the session with the service provider account, the service provider device 202 may receive service provider account information associated with the user 206 from the service provider server, and display the service provider account information in the display subsystem 208. Referring to FIG. 4, illustrated is a service provider device 202 including a display subsystem 208 displaying a service provider account 402 including service provider account information 410. In the example of FIG. 4, the service provider account information 410 includes savings account information 406 of the user 206 and checking account information 408 of the user 206 of the service provider account.

Figure 5:
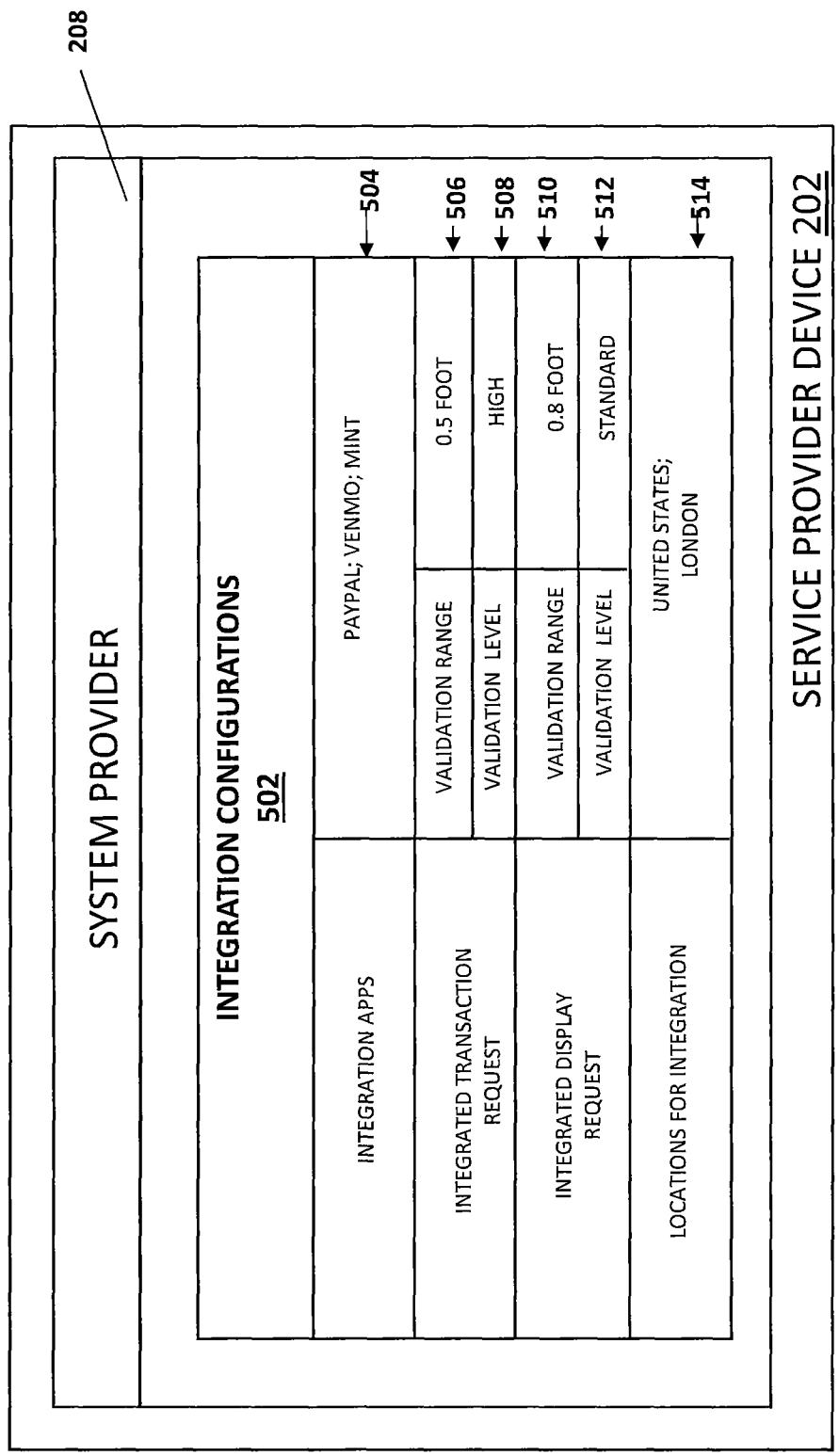
FIG. 5 is a schematic view illustrating an embodiment of a service provider device displaying account integration configurations.

In some embodiments, at block 108, after the service provider device 202 establishes the session with the service provider account, the service provider device 202 may receive, from a service provider server, information of possible third party accounts that may be integrated using the service provider device 202. Referring to FIGS. 4 and 5, in some embodiments, the possible third party accounts for integration may be determined by the service provider using integration configurations, and information of the determined possible third party accounts is provided on the display subsystem 208 of the service provider device 202.

Referring to FIG. 4, the display subsystem 208 of the service provider device displays a third party account for integration screen 404 including third party application identifiers 412 indicating applications available for integration. These third party application identifiers 412 may be determined based on integration configurations associated with the user 206.

Referring to FIG. 5, illustrated is a service provider device 202 including a display subsystem 208 displaying an integration configurations screen 502. The integration configurations screen 502 includes integration configurations 504, 506, 508, 510, 512, and 514. In some embodiments, an account integration configuration provides third party applications on the user device 204 that may be integrated with the service provider account. In an example where the service provider account associated with the service provider device 202 is a bank account, the integration configuration 504 provides that one or more financial applications (e.g., "PAYPAL," "VENMO," "MINT") on the user device 204 may be integrated in the service provider device 202. In another example where the service provider account is a food ordering account for food ordering service, an integration configuration may provide that one or more personal health management applications on the user device 204 may be integrated in the service provider device 202, such that the food ordering account may utilize health and nutrition data collected by the personal health management applications and diet advice provided by personal health management applications of the user device 204, and provide customized order recommendations to the user 206. In yet another example where the service provider account associated with the service provider device 202 (e.g., located on a vehicle) is a vehicle travel account for providing travel information service, an integration configuration may provide that one or more calendar/planner/task management applications on the user device 204 may be integrated in the service provider device 202.

In some embodiments, integration configurations may provide validation ranges and validation levels for validating various integration requests. In an example, the integration requests include an integrated transaction request for requesting a transaction associated with both the service provider account and the third party account. Such a transaction may cause changes in at least one of the service provider account and the third party account associated with the user 206. In an example, integration configuration 506 provides that validation of the integrated transaction requests includes determining that the user device 204 is within a validation range (e.g., "0.5 FOOT") of the service provider device 202. In another example, integration configuration 506 provides that integrated transaction requests are validated according to a "HIGH" validation level, which may include more/stricter validation criterions than those of a lower validation level.

In some embodiments, the validation level may be adjusted based a user device history (e.g., accrued usage duration, usage frequency, most recent usage time, location, gyro movements, proximity to the service provider device 202) associated with the user device 204. For example, after it is determined that the accrued usage duration associated with the user device 204 has reached a particular threshold (e.g., 4 hours), the validation level may be decreased (e.g., from "MEDIUM" to "LOW") to indicate a higher trust level of the user device 204. In another example, after determining that there is an increased transaction frequency (e.g., from twice a day to once a week) between a user device 204 and the service provider device 202, the validation level may be increased (e.g., from "MEDIUM" to "HIGH") to indicate a lower trust level of the user device 204.

In some examples, the integration requests include an integrated display request for requesting the display subsystem 208 to display simultaneously both the service provider account information and the third party account information. In those examples, the integrated display request may not cause any change to the service provider account and the third party account associated with the user 206. As such, the corresponding validation range and validation level may be less strict. In an example, integration configuration 506 provides that validation of the integrated transaction requests includes determining that the user device 204 is within a validation range (e.g., "0.5 FOOT") of the service provider device 202. In another example, integration configuration 506 provides that integrated transaction requests are validated according to a "STANDARD" validation level, which may include fewer or less secure validation criteria than those of a "HIGH" validation level. In an example, a "STANDARD" validation level includes a validation criterion requiring a passcode, and a "HIGH" validation level includes validation criterions requiring a passcode, security questions, and biometric identifiers.

In some embodiments, integration configurations may provide locations of the service provider devices that allow account integration. For example, integration configuration 514 provides that account integration is available when the service provider device 202 is at particular locations (e.g., "UNITED STATES," "LONDON," at locations within a predetermined distance to locations the user is known to have been in the past, such as work location, home location, certain shopping locations, and the like). According to integration configuration 510, when a user 206 accesses their service provider account using the service provider device 202 at those particular locations, the service provider device 202 and/or the user device 204 may allow the user 206 to choose third party applications to integrate, and generate integration requests (e.g., integrated display request, integrated transaction request). In other words, when the user 206 accesses their service provider account using the service provider device 202 outside those particular locations, the service provider device 202 and/or the user device 204 may not allow account integration of the service provider account and the third party account. In other embodiments, the service provider device 202 and/or the user device 204 may still allow account integration, but would first require a higher level of authentication/validation, such as a biometric scan from the service provider device 202 or the user device 204.

The method 100 may then proceed to block 110, where the service provider device 202 receives a user request associated with a particular third party account. Referring to FIG. 4, in some embodiments, at block 110, the user 206 selects a particular third party application identifier 412 (e.g., "PAYPAL") displayed on the display subsystem 208 of the service provider device 202, thereby sending to the service provider device 202 a user request associated with the third party account associated with the user 206.

Figure 6:
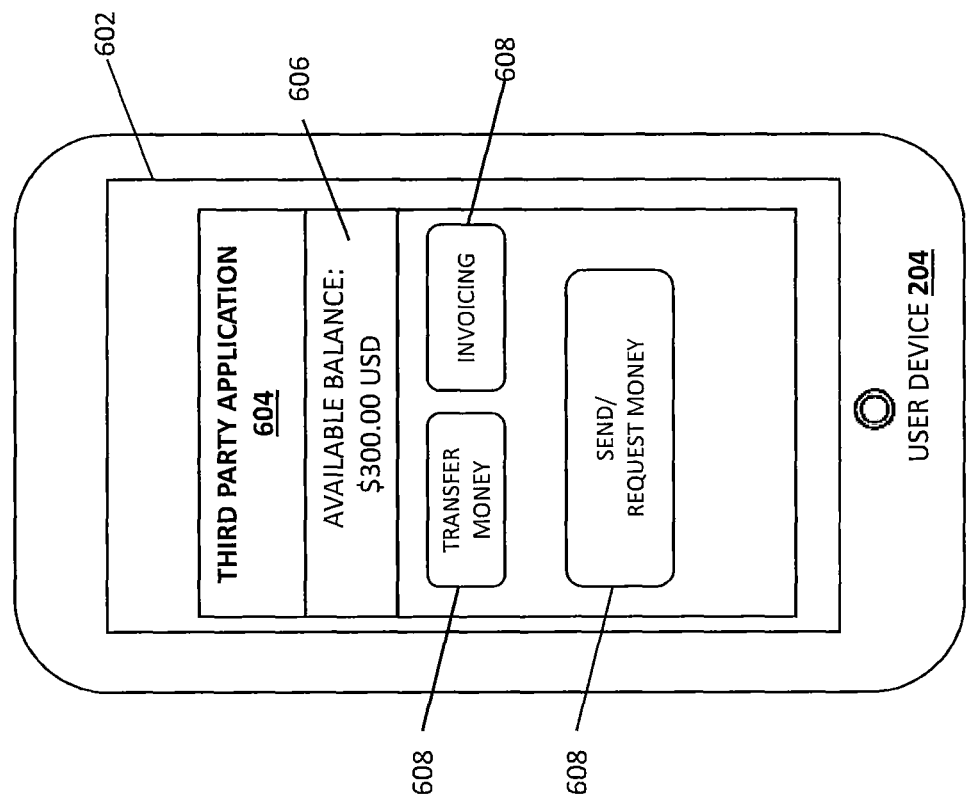
FIG. 6 is a schematic view illustrating an embodiment of a user device displaying an active session with a third party account.

The method 100 may proceed to block 112, where the service provider device 202 determines that a session between the user device 204 and the third party account of the user 206 is active. Referring to FIG. 6, illustrated therein is a user device 204 having an active session with the third party account of the user 206. In the example of FIG. 6, the active session is established after the user 206 logs into a third party application 604 (e.g., the PayPal® application available from PayPal, Inc. of San Jose, Calif.) on the user device 204, where the third party application 604 is provided by a third party service provider device. Using the active session, the user device 204 may receive third party account information associated with the user 206 from the third party service provider device, and displays the third party account information in the third party application 604 on a display 602 of the user device 204. In the example of FIG. 6, the third party account information received by the user device 204 using the active session and displayed in the third party application 604 includes an available balance 606 (e.g., "$300.00 USD") and various actions 608 (e.g., "TRANSFER MONEY," "INVOICING," "SEND/REQUEST MONEY") associated with the third party account.

In some embodiments, the service provider device 202 determines that a session between the user device 204 and the third party account of the user 206 is active based on a third party account session signal from the user device 204. In such embodiments, the user device 204 may generate a third party account session signal indicating a status (e.g., active, inactive) of a session between the user device 204 and the third party account, and send the third party account session signal to the service provider device 202 over the network (e.g., using communication devices of the service provider device 202 and the user device 204).

In some embodiments, the service provider device 202 determines that a session between the user device 204 and the third party account of the user 206 is active based on an input from the user 206. In an example, the user device 204 may generate a QR code indicating a status (e.g., active, inactive) of a session between the user device 204 and the third party account. In that example, the user 206 may present the QR code on the display 602 of the user device 204 to a bar code reader 216 of the system provider device 202. The system provider device 202 may then determine the status of a session between the user device 204 and the third party account based on the information extracted from the QR code.

Figure 7A:
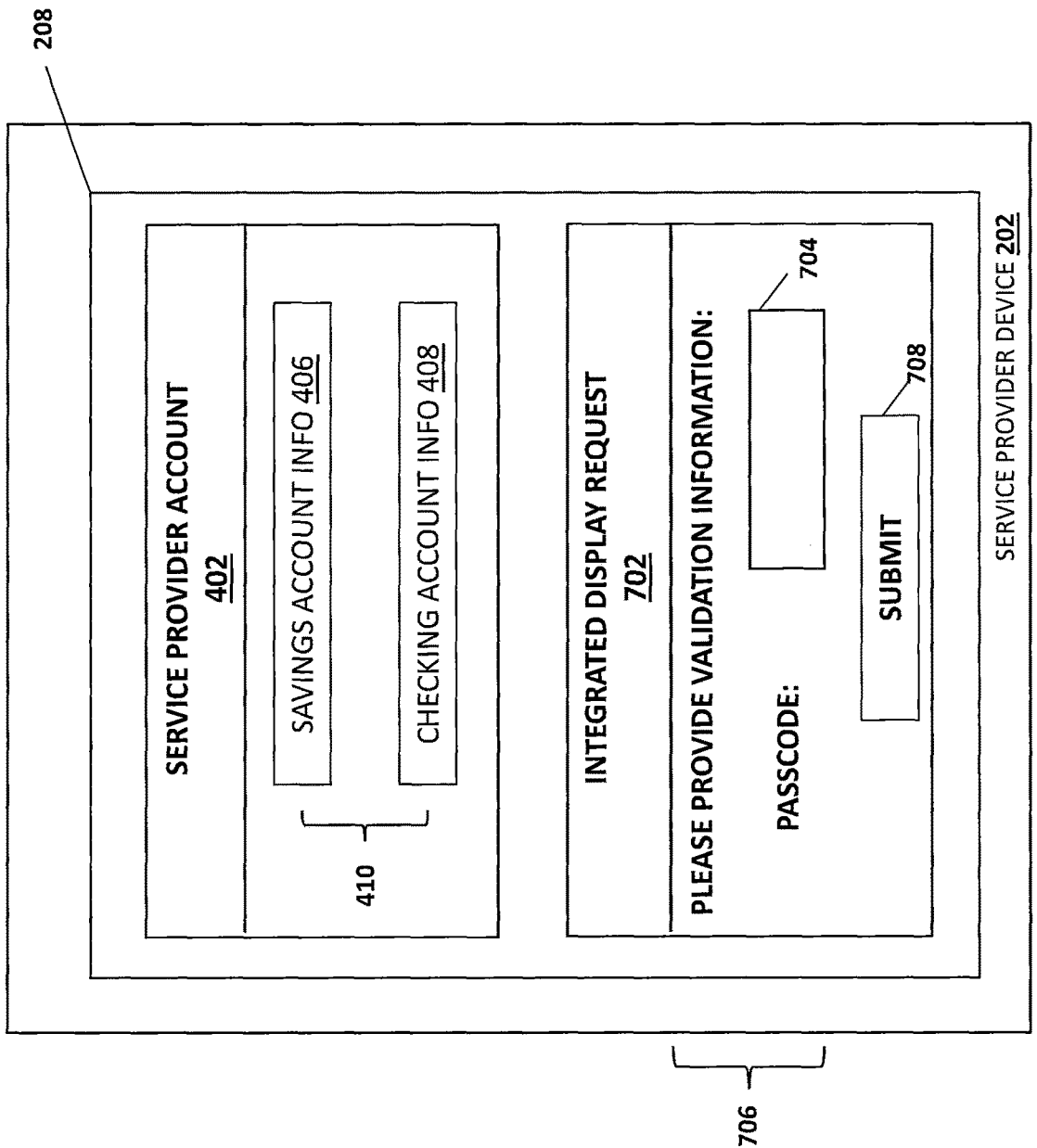
FIG. 7A is a schematic view illustrating an embodiment of a service provider device displaying integration validation request.

The method 100 may proceed to block 114, where the service provider device 202 may cause a first validation to access information associated with the active session between the user device 204 and the third party account. Referring to FIG. 7A, at block 114, the display subsystem 208 of the service provider device 202 displays an integrated display request section 702 including validation criteria 706 associated with a validation level. In some examples, because the validation is used for receiving and displaying third party account information without causing any changes to the third party account, such a validation is also referred to as a display integration validation. The associated validation criteria are referred to as display integration criteria, and the associated validation level is referred to as a display integration validation level.

In various examples, the display integration validation level may be determined based on the service provider account, the third party account, parameters (e.g., location, operating system version, type) associated with the service provider device 202 and the user device 204, the integration history associated with the service provider account and the third party account, and any other suitable parameters associated with the service provider device 202, the user device 204, and the user 206. In an example, the service provider device 202 may determine a lower validation level based on a previous integration transaction between the service provider account and the third party account of the user 206. Such a lower validation level may require fewer or less secure validation criteria, such as only a password or PIN as compared to a biometric identifier (e.g., fingerprint, retina, etc.).

In the example of FIG. 7A, the validation criteria 706 includes a validation passcode. In an example, the validation passcode may be a predetermined passcode configured by the user 206. In another example, the validation passcode may be generated dynamically (e.g., by the active session of the user device 204) and sent to the user 206 (e.g., through the user device 204 or another user device of the user 206). The user 206 may provide a validation passcode in a validation passcode field 704 provided on an integrated display request section 702 of the display subsystem 208. The user 206 may then select a submit button 708 to cause the validation information including the validation passcode to be sent by the service provider device 202 to the user device 204.

Following receiving the authentication information from the user 206 through the service provider device 202, the user device 204 may use the validation information to validate the service provider device 202 and the user 206 to use the third party account of the user 206.

In some embodiments, the third party application (e.g., the PayPal® application available from PayPal, Inc. of San Jose, Calif.) provided by the third party service provider on the user device 204 may be used to perform the validation. In one example, at block 114, the user 206 has been logged into their third party account via the third party application on their user device 204. Thus, at block 114, the third party application may then use the validation information to validate the user with the third party account provided by the third party service provider.

After the service provider device 202 is validated to access information associated with the active session between the user device 204 and the third party account, the method 100 may proceed to block 116, where the service provider device 202 receives, from the user device 204, third party account information corresponding to the third party account of the user, and concurrently displays information corresponding to the third party account of the user and the service provider account information.

Figure 7B:
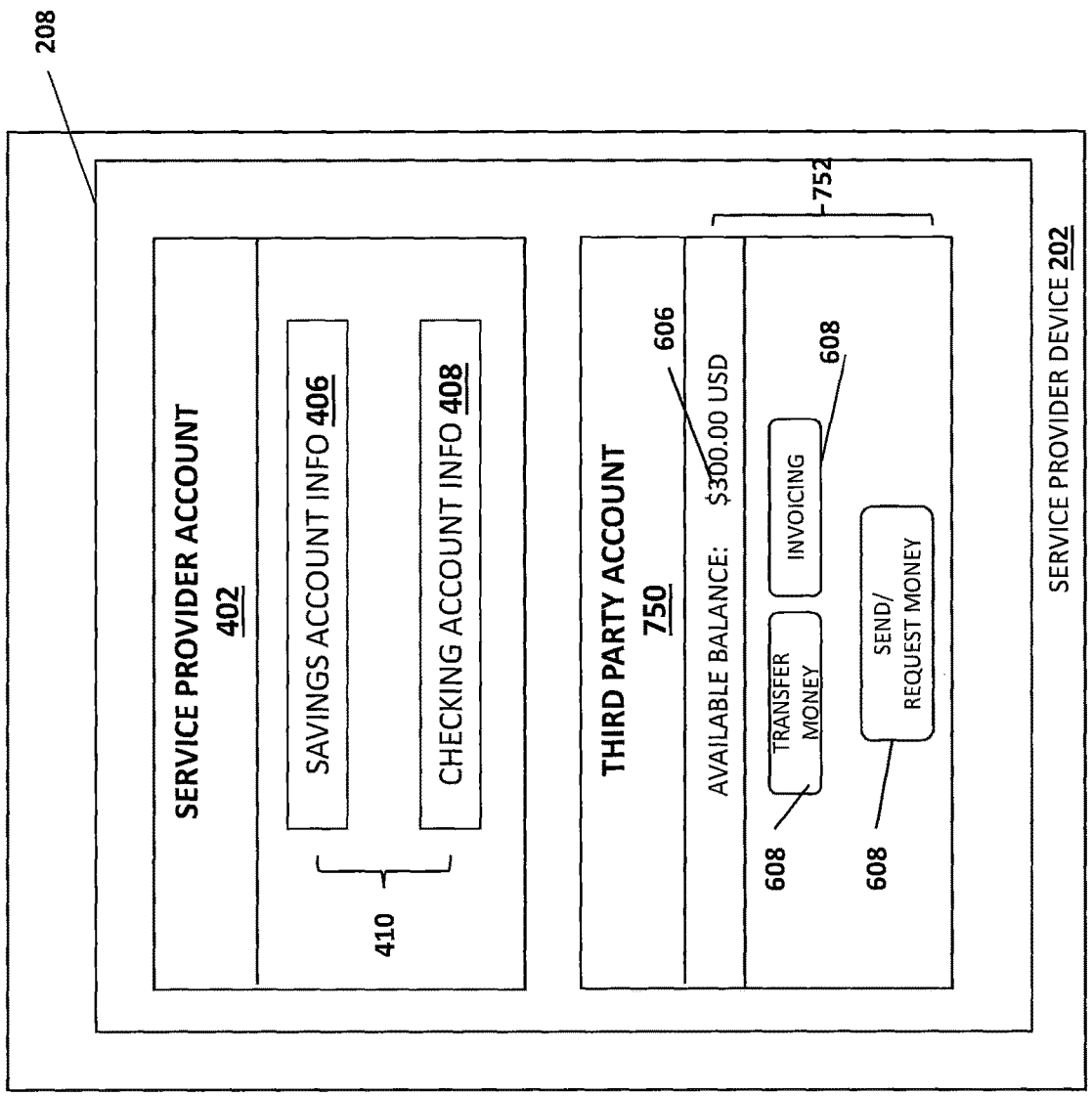
FIG. 7B is a schematic view illustrating an embodiment of a service provider device displaying simultaneously service provider account information and third party account information.

Referring to FIG. 7B, in some embodiments, the third party account information 752 displayed in a third party account information screen 750 is substantially similar to the third party account information displayed in the third party application 604 of the user device 204 as described above with reference to FIG. 6. In the example of FIG. 7B, a service provider device 202 including a display subsystem 208. The display subsystem 208 displays a service provider account 402 including service provider account information 410. The display subsystem 208 also concurrently displays a third party account information screen 750 including third party account information 752 corresponding to the third party account of the user 206. In the example of FIG. 7B, the third party account information 752 includes an available balance 606 (e.g., "$300.00 USD") and various actions 608 (e.g., "TRANSFER MONEY," "INVOICING," "SEND/REQUEST MONEY") associated with the third party account.

Figure 7C:
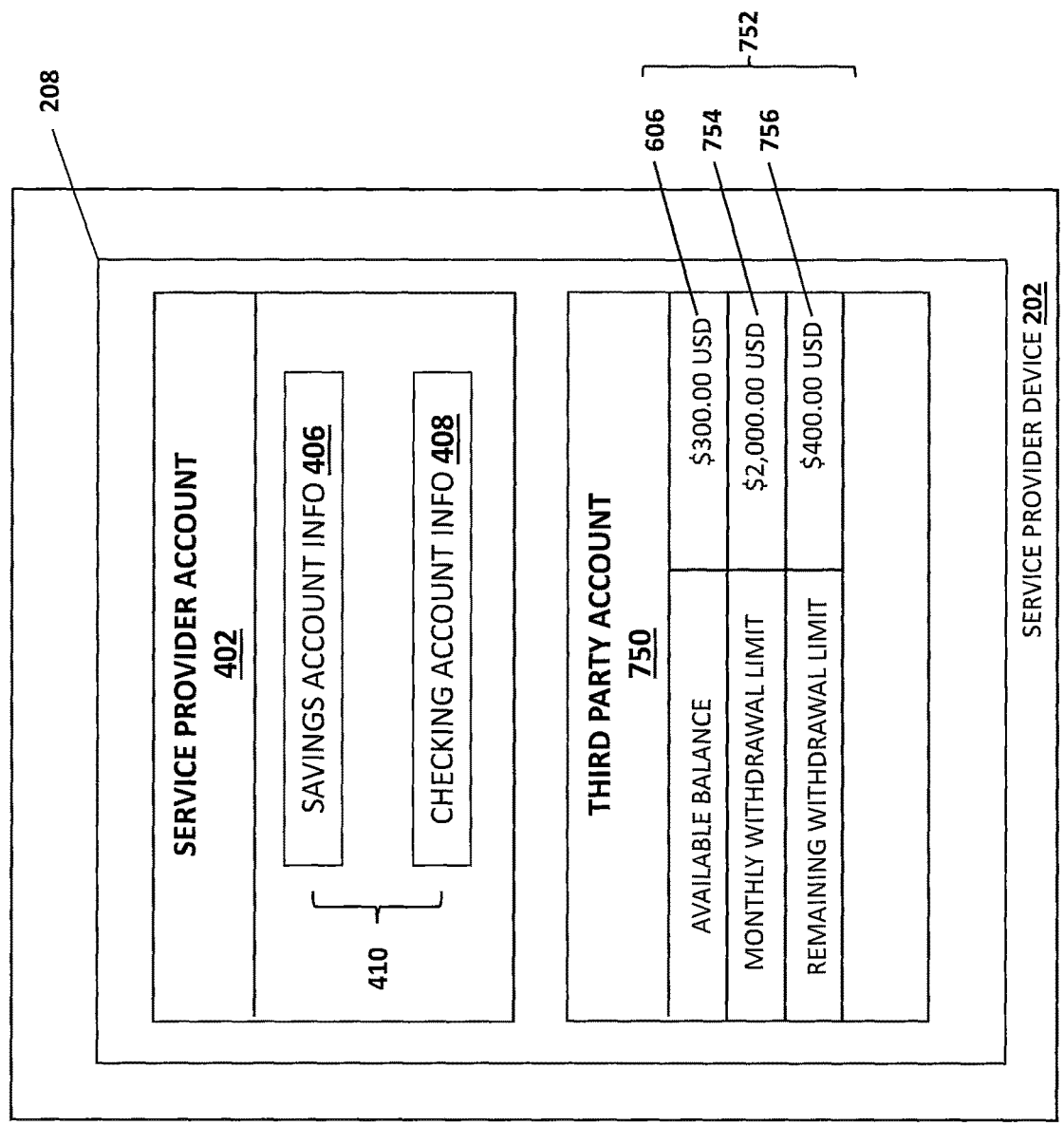
FIG. 7C is a schematic view illustrating an embodiment of a service provider device displaying simultaneously service provider account information and third party account information.

Referring to FIG. 7C, in some embodiments, the third party account information 752 displayed in the third party account information screen 750 may be different from the third party account information displayed in the third party application 604 of the user device 204. In the example of FIG. 7C, the third party account information 752 received by the service provider device 202 from the user device 204 may be customized based on the service provider device 202 and/or the service provider account 402. For example, the third party account information 752 includes available balance 606 (e.g., "$300.00 USD"), monthly withdrawal limit 754 (e.g., "$2,000.00 USD"), and remaining withdrawal limit 756 (e.g., "$600.00 USD"). In one example, the monthly withdrawal limit 754 and remaining withdrawal limit 756 are associated with the particular service provider account 402. In another example, the monthly withdrawal limit 754 and remaining withdrawal limit 756 are associated with all bank accounts of the user 206. The monthly withdrawal limit 754 and remaining withdrawal limit 756 may be used in subsequent steps for generating integrated transaction requests associated with both the service provider account 402 and the third party account.

Figure 8A:
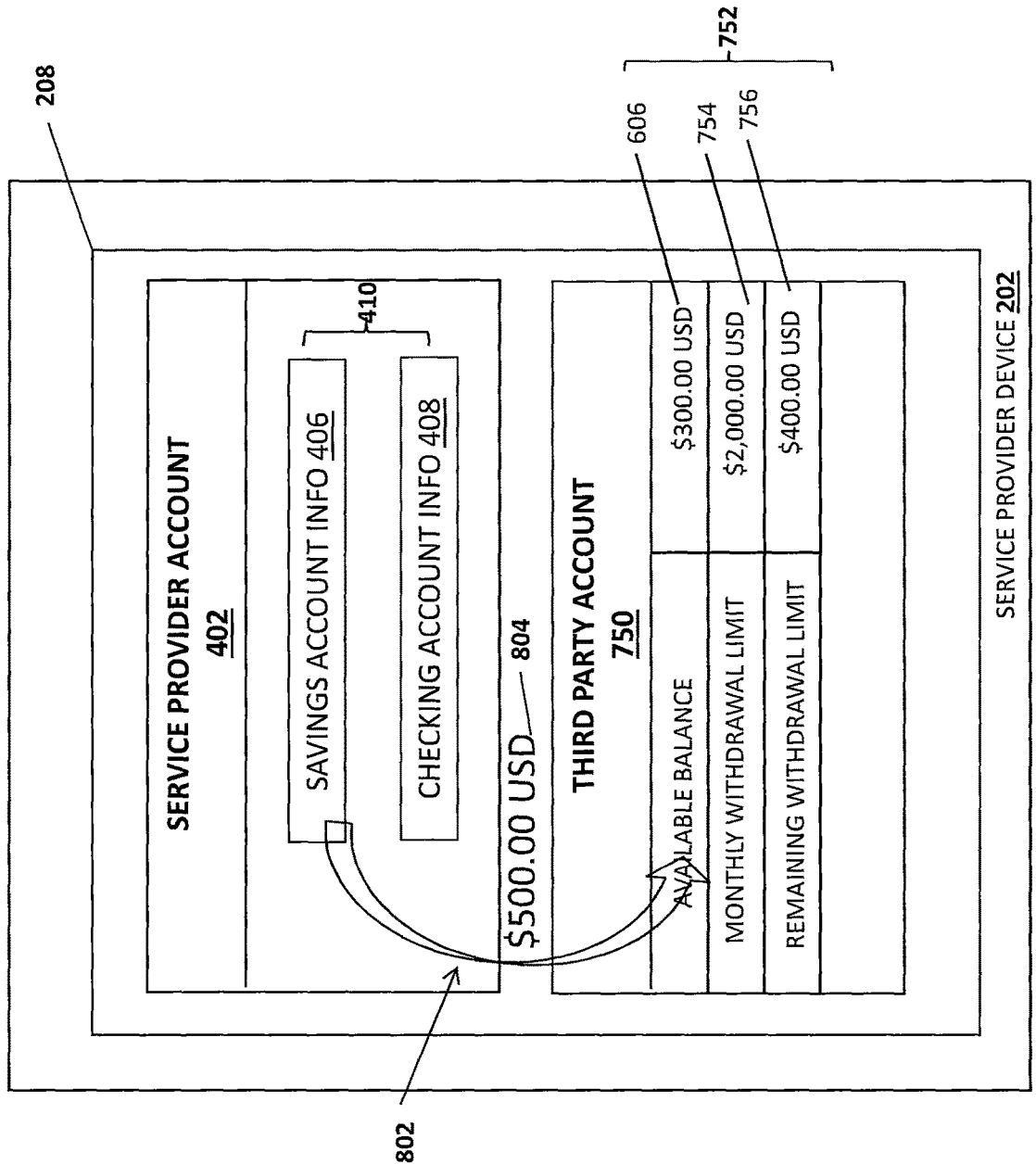
FIG. 8A is a schematic view illustrating an embodiment of a service provider device displaying a transaction request associated with a service provider account and a third party account.

The method 100 may then proceed to block 118, where the service provider device 202 receives an integrated transaction request 802 for performing a transaction associated with the service provider account and the third party account. Referring to the example of FIG. 8A, the user 206 may generate an integrated transaction request 802 by using the service provider account information 410 and the third party account information 752 that are concurrently displayed on the service provider device 202. In an example, the user 206 draws an arrow or moves a finger on a touch screen display from the savings account information 406 of the service provider account 402 to the available balance 606 in the third party account information screen 750 to generate an integrated transaction request 802 for transferring money from the savings account of the service provider account to the third party account. A drag and drop action may also be used to indicate the desired integrated transaction request 802, such as by dragging the savings account information 406 to the available balance 606 or vice versa. The integrated transaction request 802 may include a transfer amount 804 ("$500.00 USD"). In an example, the transfer amount 804 is provided by the user 206 using an input system 212 of the service provider device 202. In another example, the transfer amount 804 is provided by the user 206 by drawing the transfer amount in the third party account information screen 750. In an example, the user 206 may send voice commands to the service provider device 202 to generate the integrated transaction request 802.

The method 100 may then proceed to block 120, where the service provider device 202 may display a validation request associated with the integrated transaction request, receive validation information, and send the validation information to cause validation of the integrated transaction request by the third party service provider. Referring to the example of FIG. 8B, at block 120, the service provider device 202 displays a validation request 856 for the integrated transaction request 802. The validation request 856 may be generated based on integration configuration 508, which provides that the corresponding validation level (e.g., "HIGH") for the integrated transaction request 902 is higher than a validation level (e.g., "STANDARD") for an integrated display request section 702 of FIG. 7A. As such, the validation request 856 may include more validation criteria associated the higher validation level. As illustrated in FIG. 8B, a user 206 may provide a validation passcode of the validation information for the validation request 856 in a passcode field 852, and provide a security answer to a security question (e.g., "NAME OF YOUR FIRST PET") in a security answer field 854. The user 206 may then select a submit button 858 to cause the validation information including the validation passcode and the security answer to be sent by the service provider device 202 to the user device 204.

The method may then proceed to block 122, where the integrated transaction request 802 is processed by the service provider device 202 and/or the third party account provider device providing the third party account by transferring the requested transfer amount 804 of the integrated transaction request 802 from the service provider account to the third party account. In an example, the service provider device 202 determines that the requested transfer amount 804 (e.g., "$500.00 USD") of the integrated transaction request 802 exceeds the remaining withdrawal limit 756 (e.g., "$400.00 USD") of the third party account information 752. In that example, the service provider device 202 may update the integrated transaction request 802 to changes the requested transfer amount 804 to the remaining withdrawal limit 756.

Figure 8C:
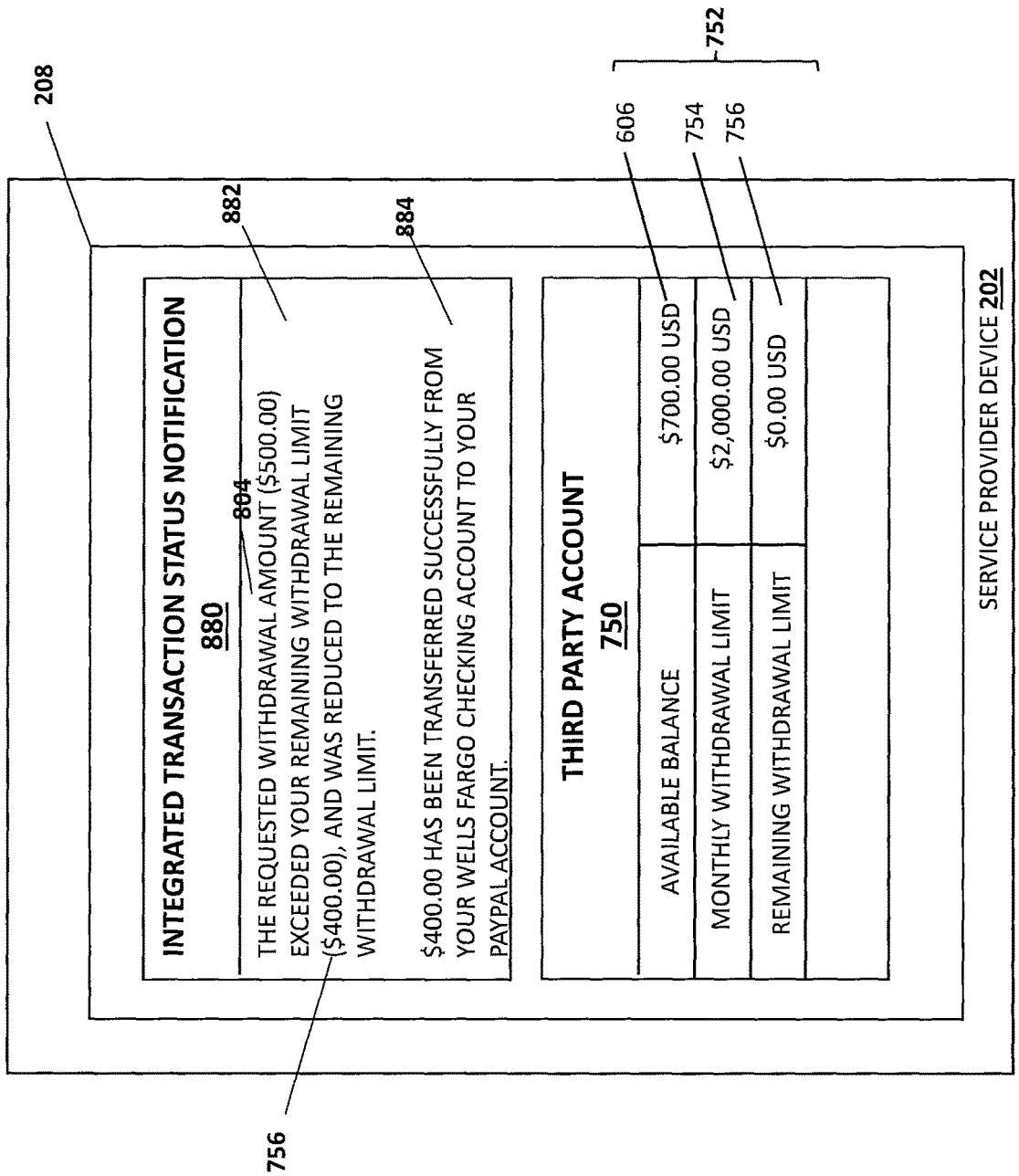
FIG. 8C is a schematic view illustrating an embodiment of a service provider device displaying a transaction status notification.

Referring to FIG. 8C, in some embodiments, at block 122, after the integrated transaction request 802 is performed, the service provider device 202 provides an integrated transaction status notification to the user 206. In the example of FIG. 8C, the display subsystem 208 of the service provider device 202 displays an integrated transaction status notification 880. The integrated transaction status notification 880 includes a withdraw amount change message 882 notifying the user 206 that because the requested transfer amount 804 exceeds the remaining withdrawal limit 756, the requested transfer amount 804 of the integrated transaction request 802 is reduced to the remaining withdrawal limit 756. The integrated transaction status notification 880 also includes an integrated transaction completed message 884 notifying the user 206 that the integrated transaction has been performed by transferring the updated transfer amount (e.g., "$400") from a service provider account (e.g., "WELLS FARGO CHECKING ACCOUNT") to a third party account (e.g., "PAYPAL ACCOUNT").

As illustrated in the FIG. 8C, in some embodiments, after the integrated transaction request 802 has been performed, the service provider device 202 receives updated third party account information 752 from the user device 204, and displays the updated third party account information 752 through its display subsystem 208. In the example of FIG. 8C, the third party account information 752 includes updated available balance 606 (e.g., "$700.00 USD"), which is the total of the previous available balance 606 (e.g., "$300.00 USD") and the updated transfer amount (e.g., "$400"). In that example, the third party account information 752 includes remaining withdrawal limit 756 (e.g., "$0.00 USD"), which is determined based on the remaining withdrawal limit 756 (e.g., "$400.00 USD") prior to performing the integrated transaction request 802 and the updated transfer amount (e.g., "$400").

Figure 9:
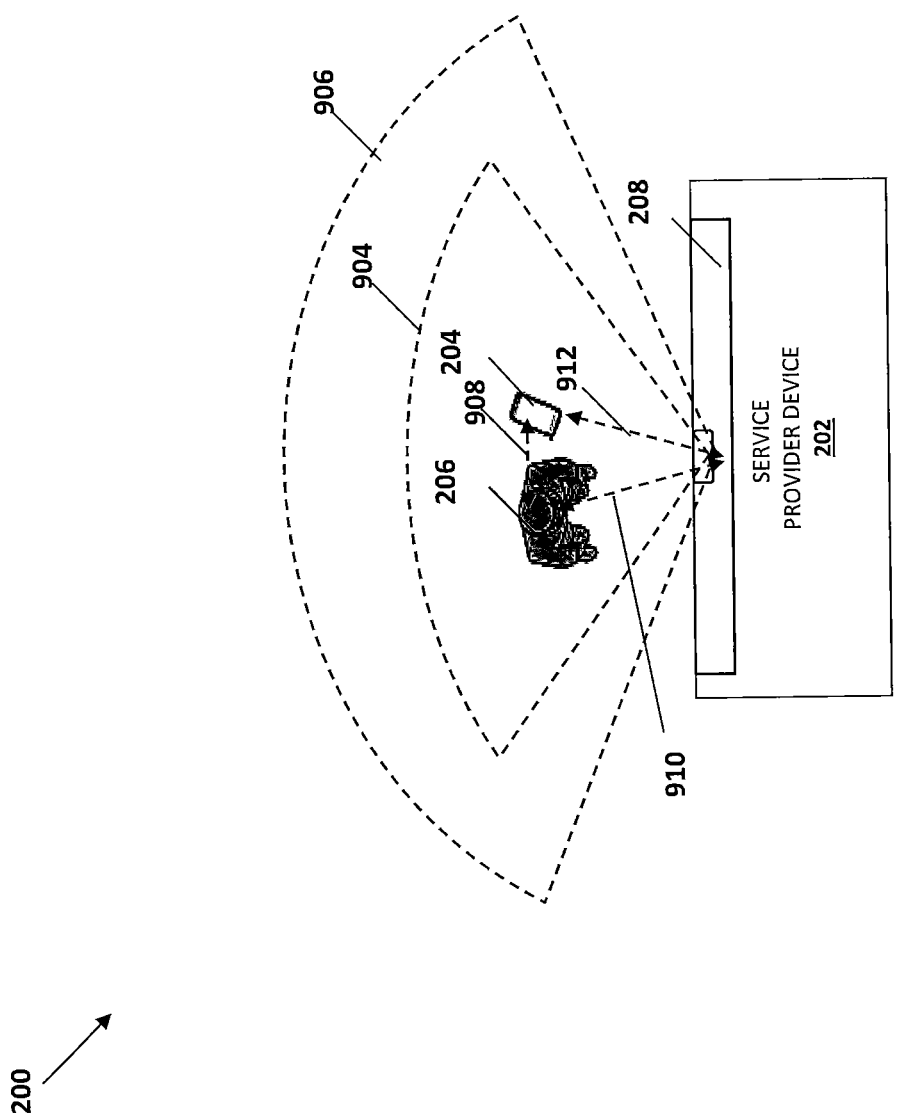
FIG. 9 is a top view illustrating an embodiment of a service provider physical location including a service provider device and a user device.

Referring to FIG. 9, in various embodiments, various integration requests (e.g., integrated display request, integrated transaction request) may be associated with different validation levels and validation ranges. An integration request may be validated according to the corresponding validation level (e.g., according to integration configurations 508, 512) after it is determined that the user device 204 is located within a validation range (e.g., according to integration configurations 506, 510). Referring to the example of FIG. 9, a service provider physical location 200 includes a service provider device 202, a user device 204, and a user 206. As illustrated in the example of FIG. 9, an integrated transaction request (e.g., integrated transaction request 802) that may cause changes to the third party account may have a validation range 904 that is smaller than the validation range 906 for an integrated display request. In some embodiments, the validation may be performed based on a distance 908 between the user device 204 and the user 206, a distance 910 between the user 206 and the service provider device 202, and/or a distance 912 between the user device 204 and the service provider device 202. In an example, location data of the user 206 may be determined based on images captured by a camera at the physical location 200 (e.g., a camera of the service provider device), and location data of the user device 204 and the service provider device 202 may be determined based on location sensors thereof. As such, the distances 908, 910, and 912 may be determined based on the location data of the user 206, the user device 204, and the service provider device 202.

Thus, systems and methods have been described that provide electronic authentication and account integration that allow mobile user devices to facilitate account integration at a service provider device for accounts associated with different service providers. A user may send a first user request to a service provider device that causes establishment of a session with a service provider account. The user may then send a second user request to the service provider device for accessing third account information using the user device. Such a second user request may be validated using an active session between the user device and the third party account of the user. The active session may also be used to access the third account information. In some embodiments, the service provider device may perform account integration based on the session with the service provider account and the active session between the user device and the third party account of the user, and provided an integrated display by displaying concurrently, using a display interface of the service provider device, the third party account information and the service provider account information. In some embodiments, the service provider device may perform account integration based on the session with the service provider account and the active session between the user device and the third party account of the user, and cause an integrated transaction associated with the third party account and the service provider account to be performed. In various embodiments, location based authentication may be used to validate the user requests and transaction requests for improved security.

Figure 10:
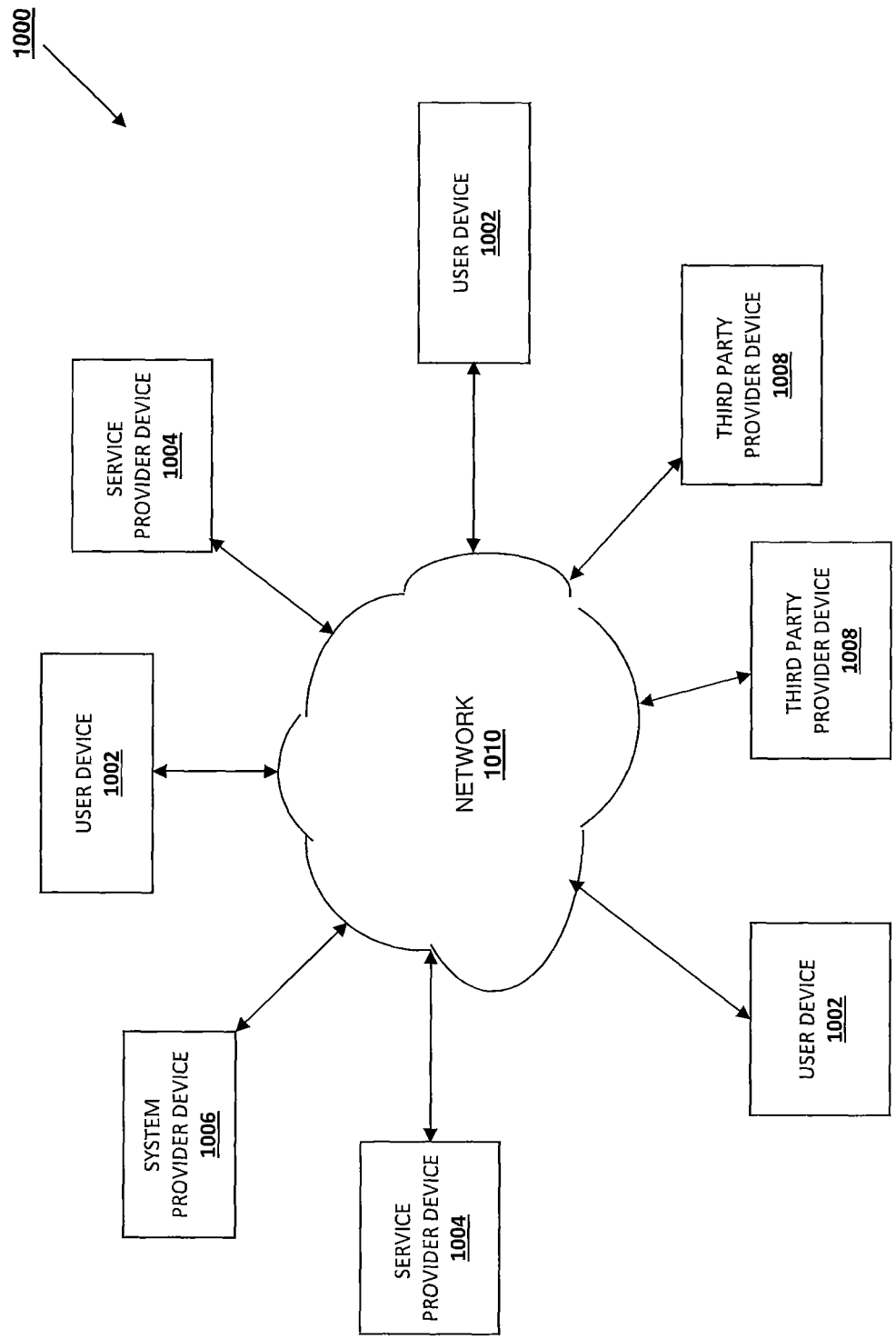
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Example servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more service provider devices 1004, one or more system provider devices 1006, and one or more third party service provider devices 1008 in communication over a network 1010. Any of the user devices 1002 may be the user device 204 discussed above and used by the user discussed above. The system provider device 1006 may be the system provider device discussed above and may be operated by a system provider such as, for example, PayPal Inc. of San Jose, Calif. The third party service provider device 1008 may be the service provider device discussed above and may be operated by various service providers including payment service providers, gaming service providers, travel service providers, and/or any other service providers.

The user devices 1002, service provider devices 1004, system provider devices 1006, and third party service provider devices 1008 may each include one or more processors, memories, and other appropriate components for executing instructions such as program code and/or data stored on one or more computer-readable mediums to implement the various applications, data, and steps described herein. For example, such instructions may be stored in one or more computer-readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the user to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include a personal financial management application and/or a personal health management application provided by a third party provider through a third party provider device 1008. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the service provider device 1004, the system provider device 1006, and/or the third party service provider device 1008 to associate the user with a particular account as further described herein.

Note that service provider device 1004 may be a part of another device, such as system provider device 1006, in various embodiments. Functionality of various ones of the devices shown in FIG. 10 and/or referred to herein may be combined into a single or different devices as consistent with the techniques discussed. Thus, functionality or structures described individually relative to the service provider device 1004, system provider device 1006, or third party service provider device 1008 may be combined into one or more systems in various embodiments.

Figure 11:
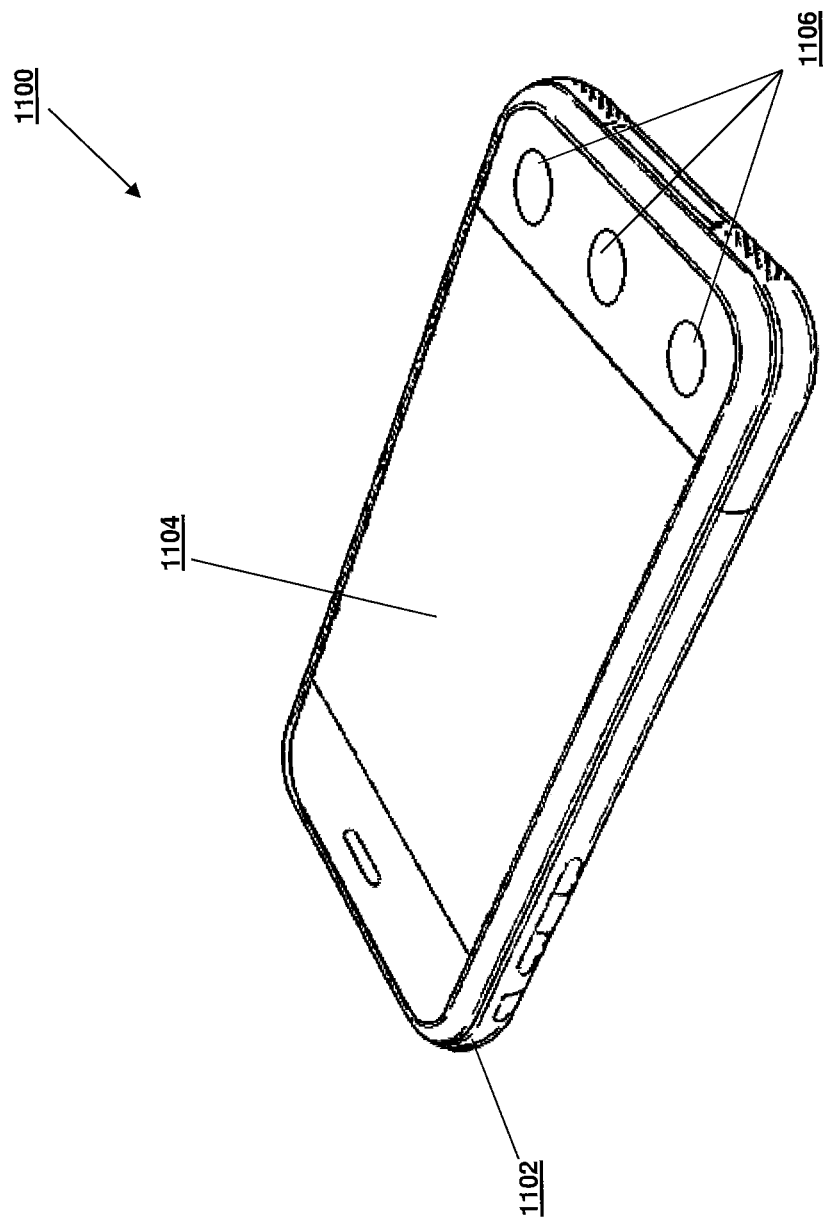
FIG. 11 is a perspective view illustrating an embodiment of a user device.

Referring now to FIG. 11, an embodiment of a user device 1100 is illustrated. The user device 1100 may be the user device 204. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile user devices may be used in the method 100 without departing from the scope of the present disclosure.

Figure 12:
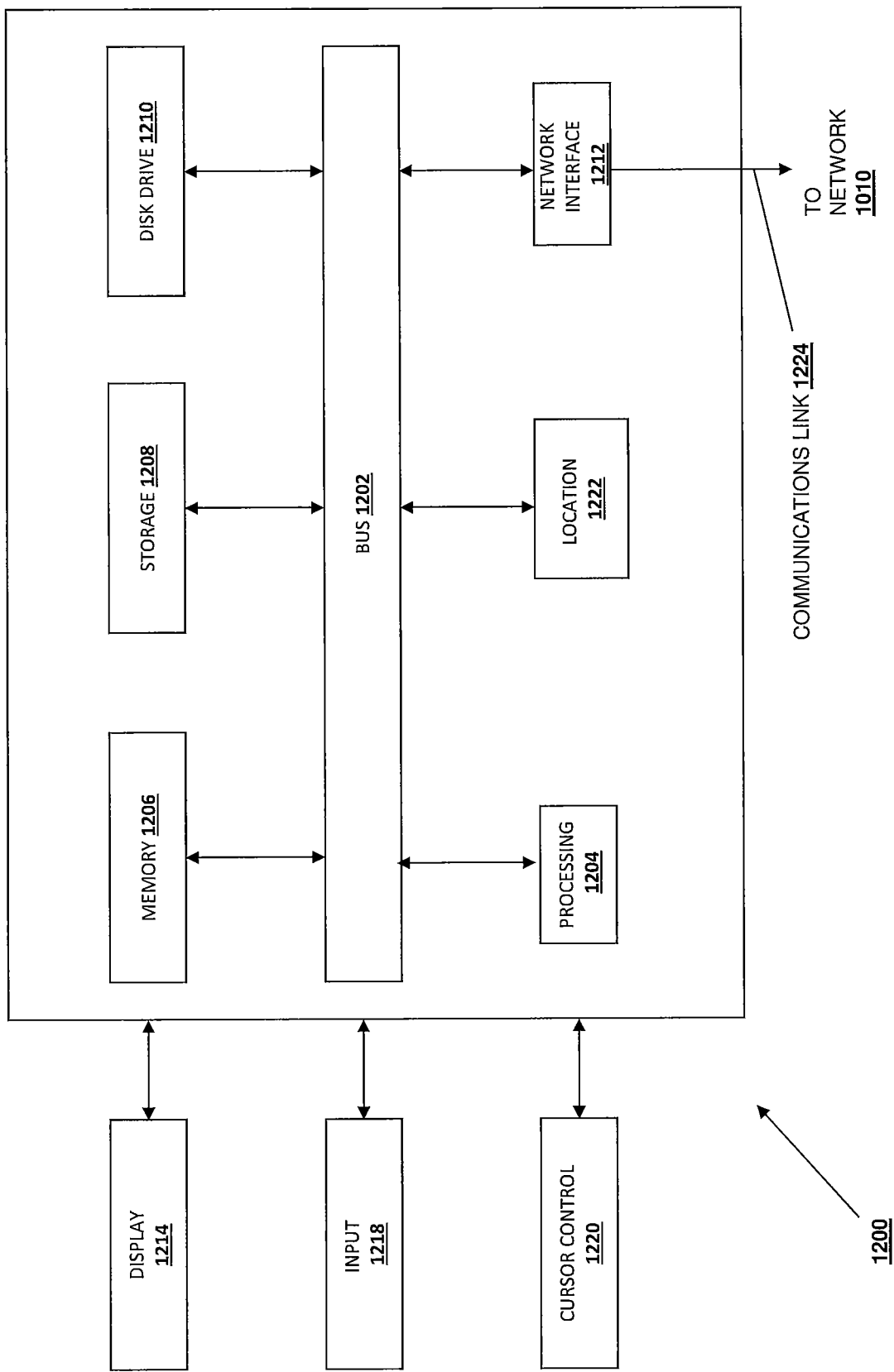
FIG. 12 is a schematic view illustrating an embodiment of a computer system.

Referring now to FIG. 12, an embodiment of a computer system 1200 suitable for implementing, for example, the computer systems of the service provider device 202, user device 204, user devices 1002, service provider devices 1004, system provider devices 1006, and third party service provider devices 1008, is illustrated. It should be appreciated that other devices utilized by users, payment service providers, other third party service providers, and/or system providers in the system discussed above may be implemented as the computer system 1200 in a manner as follows. In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the service provider device 202, user device 204, the system provider device 500, user devices 1002, service provider devices 1004, system provider devices 1006, and third party service provider devices 1008. Such instructions may be read into the system memory component 1206 from another computer-readable medium, such as the static storage component 1208 or the disk drive component 1210. In other embodiments, hard-wired circuitry may be used in place of or in combination with software instructions to implement the present disclosure.

Logic may be encoded in a computer-readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable medium includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable medium is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
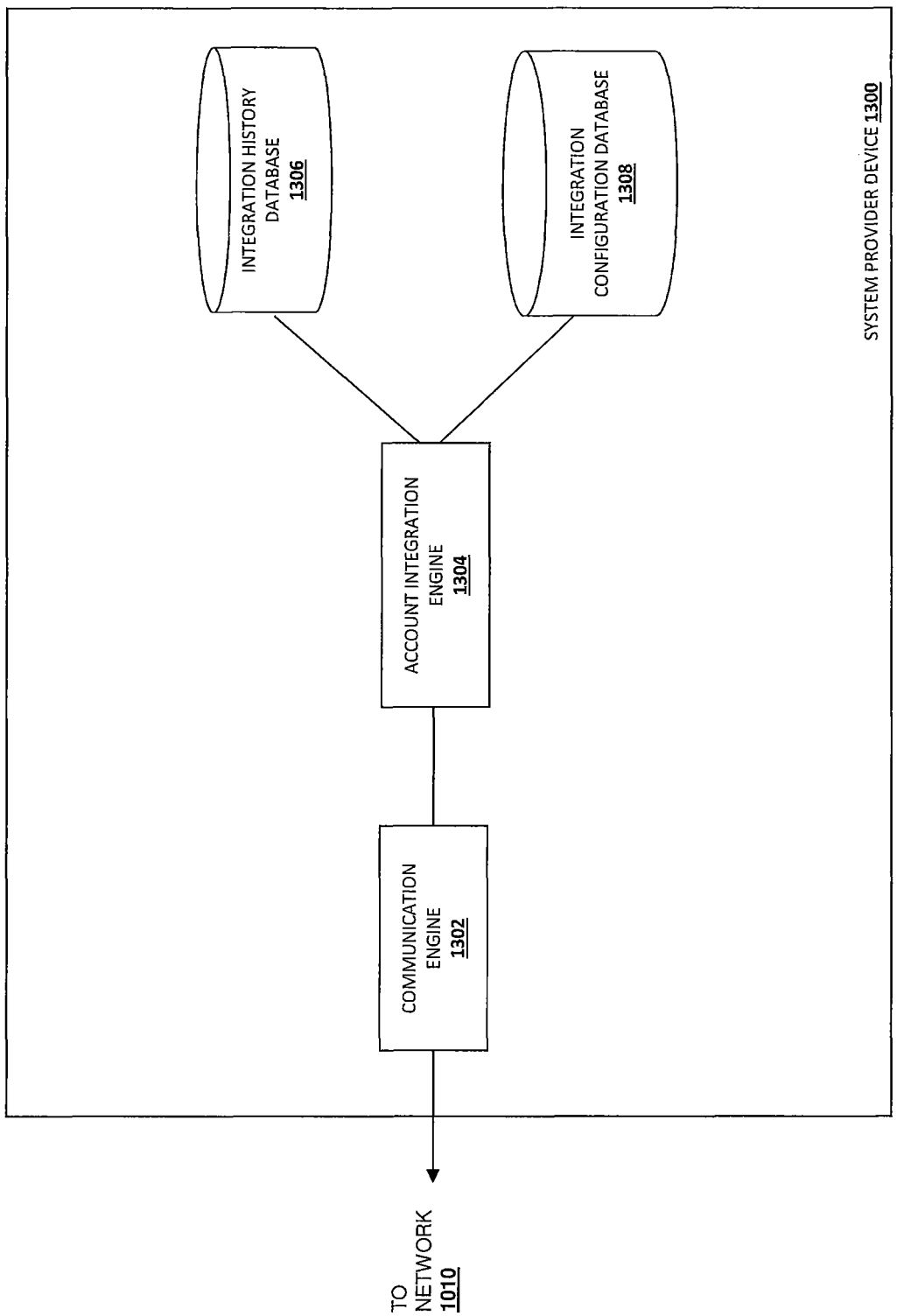
FIG. 13 is a schematic view illustrating an embodiment of a system provider device.

Referring now to FIG. 13, an embodiment of a system provider device 1300 is illustrated. In an embodiment, the system provider device 1300 may be the system provider devices discussed above. The system provider device 1300 includes a communication engine 1302 that is coupled to the network 1010 and to an account integration engine 1304 that is coupled to an integration history database 1306 and an integration configuration database 1308. The communication engine 1302 may be software or instructions stored on a computer-readable medium that allows the system provider device 1300 to send and receive information over the network 1010. The account integration engine 1304 may be software or instructions stored on a computer-readable medium that is operable to in response to a first user request to initiate a first session with a service provider account of a user, establishing the first session with the service provider account and displaying service provider account information on the display interface; in response to a second user request to access third party account information associated with a third party account of the user, determining that a second session between a user device and the third party account of the user is active; causing a first validation to access the third party account information associated with the second session; updating the display interface to concurrently display the third party account information and the service provider account information; in response to receiving a transaction request for a transaction associated with the service provider account of the user and the third party account of the user, sending information to cause a second validation of the transaction request by a provider of the third party account; in response to the second validation of the transaction request by the provider of the third party account, processing the requested transaction, and provide any of the other functionality that is discussed above. While the databases 1306-1308 have been illustrated as separate from each other and located in the system provider device 1300, one of skill in the art will recognize that any or all of the databases 1306-1308 may be combined and/or may be connected to the account integration engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider device of a service provider, comprising:
a wireless communications adapter;
a display interface;
a processor; and
a non-transitory computer-readable medium having instructions stored thereon that are executable to cause the service provider device to perform operations comprising:
receiving a first request, via the wireless communications adapter from a first user device, to initiate a first communication session between the service provider device and a first electronic account provider, wherein the service provider device corresponds to an owner entity for the service provider device that is different than the first electronic account provider, and wherein the service provider device is not controlled by the first electronic account provider;
receiving, from the first user device, an authorization credential for a first user account of a user of the first user device, wherein the first user account is with the first electronic account provider;
using the authorization credential, establishing the first communication session with the first electronic account provider;
responsive to establishing the first communication session with the first electronic account provider, obtaining electronic account information corresponding to the first user account of the user of the first user device;
determining, via a wireless communications protocol, whether the first user device is within a wireless proximity range to the service provider device;
based on the first user device being within a wireless proximity range to the service provider device, concurrently displaying the electronic account information on the display interface of the service provider device along with service provider information of the service provider;
receiving a request from the first user to process an electronic transaction based on the concurrently displayed electronic account information and the service provider information of the service provider; and
based on the first user device still being within the wireless proximity range to the service provider device, causing the electronic transaction to be processed.

2. The service provider device of claim 1, further comprising:
a user input interface component, wherein the request from the first user to process an electronic transaction is received via the user input interface component.

3. The service provider device of claim 2, wherein the user input interface component comprises a touchscreen component.

4. The service provider device of claim 1, wherein causing the electronic transaction to be processed comprises receiving user input at the service provider device, and based on the received user input, transmitting a transaction request to the electronic account provider.

5. The service provider device of claim 4, wherein the transaction request comprises a request to transfer funds via the first user account to the owner entity for the service provider device.

6. The service provider device of claim 4, wherein the transaction request comprises a request to transfer funds via the first user account to a third party entity different from the owner entity for the service provider device.

7. The service provider device of claim 1, wherein the concurrently displayed electronic account information on the display interface of the service provider device comprises balance information for the first user account.

8. The service provider device of claim 1, wherein the concurrently displayed electronic account information on the display interface of the service provider device comprises a plurality of funding sources for the electronic transaction, and wherein the operations further comprise:
- receiving, from the first user, a selection of a first one of the plurality of funding sources for the electronic transaction, wherein causing the electronic transaction to be processed is based on the selection of the first funding source.

9. A non-transitory computer-readable medium having stored thereon instructions that are executable by a service provider device to cause the service provider device to perform operations comprising:
- receiving a first request, from a first user device via a wireless communications adapter of the service provider device, to initiate a first communication session between the service provider device and a first electronic account provider, wherein the service provider device corresponds to an owner entity for the service provider device that is different than the first electronic account provider, and wherein the service provider device is not controlled by the first electronic account provider;
- receiving, from the first user device, an authorization credential for a first user account of a user of the first user device, wherein the first user account is with the first electronic account provider;
- using the authorization credential, establishing the first communication session with the first electronic account provider;
- responsive to establishing the first communication session with the first electronic account provider, obtaining electronic account information corresponding to the first user account of the user of the first user device;
- determining, via a wireless communications protocol, whether the first user device is within a wireless proximity range to the service provider device;
- based on the first user device being within a wireless proximity range to the service provider device, concurrently displaying the electronic account information on the display interface of the service provider device along with service provider information of the service provider;
- receiving a request from the first user to process an electronic transaction based on the concurrently displayed electronic account information and the service provider information of the service provider; and
- based on the first user device still being within the wireless proximity range to the service provider device, causing the electronic transaction to be processed.

10. The non-transitory computer-readable medium of claim 9, wherein receiving the authorization credential for the first user account comprises receiving a biometric authentication credential of the first user.

11. The non-transitory computer-readable medium of claim 9, wherein receiving the authorization credential for the first user account comprises receiving a passcode of the first user.

12. The non-transitory computer-readable medium of claim 9, wherein the operations further comprise:
- receiving the request from the first user to process the electronic transaction via a user input interface component of the service provider device.

13. The non-transitory computer-readable medium of claim 12, wherein the user input interface component comprises a touchscreen component.

14. The non-transitory computer-readable medium of claim 9, wherein causing the electronic transaction to be processed comprises receiving user input at the service provider device, and based on the received user input, transmitting a transaction request to the electronic account provider.

15. A method, comprising:
- receiving a first request, from a first user device via a wireless communications adapter of a service provider device, to initiate a first communication session between the service provider device and a first electronic account provider, wherein the service provider device corresponds to an owner entity for the service provider device that is different than the first electronic account provider, and wherein the service provider device is not controlled by the first electronic account provider;
- receiving, at the service provider device from the first user device, an authorization credential for a first user account of a user of the first user device, wherein the first user account is with the first electronic account provider;
- using the authorization credential, the service provider device establishing the first communication session with the first electronic account provider;
- responsive to establishing the first communication session with the first electronic account provider, the service provider device obtaining electronic account information corresponding to the first user account of the user of the first user device;
- the service provider device determining, via a wireless communications protocol, whether the first user device is within a wireless proximity range to the service provider device;
- based on the first user device being within a wireless proximity range to the service provider device, concurrently displaying the electronic account information on a display interface of the service provider device along with service provider information of the service provider;
- receiving a request from the first user to process an electronic transaction based on the concurrently displayed electronic account information and the service provider information of the service provider; and
- based on the first user device still being within the wireless proximity range to the service provider device, the service provider device causing the electronic transaction to be processed.

16. The method of claim 15, wherein causing the electronic transaction to be processed comprises receiving user input at the service provider device, and based on the received user input, transmitting a transaction request to the electronic account provider.

17. The method of claim 16, wherein the transaction request comprises a request to transfer funds via the first user account to the owner entity for the service provider device.

18. The method of claim 16, wherein the transaction request comprises a request to transfer funds via the first user account to a third party entity different from the owner entity for the service provider device.

19. The method of claim 15, wherein receiving the authorization credential for the first user account comprises receiving a biometric authentication credential of the first user, wherein the biometric authentication credential is collected via the first user device.

20. The method of claim 15, further comprising:
- scanning, by the service provider device, a QR code displayed by the first user device; and extracting QR information from the QR code, wherein concurrently displaying the electronic account information along with the service provider information is based on the extracted QR information.

\* \* \* \* \*